(12) United States Patent
Nomura et al.

(10) Patent No.: US 12,071,373 B2
(45) Date of Patent: Aug. 27, 2024

(54) SUBSTRATE, LIQUID CRYSTAL ANTENNA AND HIGH-FREQUENCY DEVICE

(71) Applicant: AGC Inc., Tokyo (JP)

(72) Inventors: Shuhei Nomura, Tokyo (JP); Kazutaka Ono, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 17/022,264

(22) Filed: Sep. 16, 2020

(65) Prior Publication Data
US 2020/0407267 A1 Dec. 31, 2020

Related U.S. Application Data

(63) Continuation of application No. PCT/JP2019/010423, filed on Mar. 13, 2019.

(30) Foreign Application Priority Data

Mar. 20, 2018 (JP) .................................. 2018-053081

(51) Int. Cl.
*B32B 15/04* (2006.01)
*B32B 17/06* (2006.01)
(Continued)

(52) U.S. Cl.
CPC ................ *C03C 4/16* (2013.01); *C03C 3/091* (2013.01); *H01Q 1/36* (2013.01); *C03C 2204/00* (2013.01)

(58) Field of Classification Search
CPC ...................................................... C03C 4/16
(Continued)

(56) References Cited

U.S. PATENT DOCUMENTS

| 5,747,396 A | 5/1998 | Miyakoshi et al. |
| 9,556,060 B2 * | 1/2017 | Yang ..................... C03C 4/16 |

(Continued)

FOREIGN PATENT DOCUMENTS

| CN | 102923953 A | 2/2013 |
| JP | 2004-26529 A | 1/2004 |

(Continued)

OTHER PUBLICATIONS

International Search Report issued Jun. 18, 2019 in PCT/JP2019/010423 filed on Mar. 13, 2019, 4 pages.
(Continued)

*Primary Examiner* — Lauren R Colgan
(74) *Attorney, Agent, or Firm* — Oblon, McClelland, Maier & Neustadt, L.L.P.

(57) ABSTRACT

The present invention relates to a substrate having a dielectric loss tangent (A) as measured at 20° C. and 10 GHz of 0.1 or less, a dielectric loss tangent (B) as measured at 20° C. and 35 GHz of 0.1 or less, and a ratio [a dielectric loss tangent (C) as measured at an arbitrary temperature in a range of −40 to 150° C. and at 10 GHz]/[the dielectric loss tangent (A)] of 0.90-1.10, or a substrate having a relative permittivity (a) as measured at 20° C. and 10 GHz of 4 or more and 10 or less, a relative permittivity (b) as measured at 20° C. and 35 GHz of 4 or more and 10 or less, and a ratio [a relative permittivity (c) as measured at an arbitrary temperature in a range of −40 to 150° C. and at 10 GHz]/[the relative permittivity (a)] of 0.993-1.007.

31 Claims, 2 Drawing Sheets

(51) Int. Cl.
*C03C 3/091* (2006.01)
*C03C 4/16* (2006.01)
*H01Q 1/36* (2006.01)

(58) Field of Classification Search
USPC .............................................. 428/220, 426
See application file for complete search history.

(56) References Cited

U.S. PATENT DOCUMENTS

| | | | |
|---|---|---|---|
| 10,562,810 B2 * | 2/2020 | Hausrath | C03C 4/16 |
| 10,974,987 B2 * | 4/2021 | Ono | H05K 1/0306 |
| 2003/0054936 A1 * | 3/2003 | Tamura | C03C 3/091 |
| | | | 501/35 |
| 2013/0023400 A1 * | 1/2013 | Koyama | C03C 3/091 |
| | | | 65/95 |
| 2013/0029830 A1 * | 1/2013 | Koyama | C03C 3/091 |
| | | | 65/95 |
| 2015/0051060 A1 * | 2/2015 | Ellison | C03C 13/046 |
| | | | 65/53 |
| 2015/0236412 A1 | 8/2015 | Bily et al. | |
| 2015/0236415 A1 | 8/2015 | Bily et al. | |
| 2017/0174559 A1 * | 6/2017 | DeLamielleure | C03C 3/093 |
| 2017/0190607 A1 * | 7/2017 | Mauro | C03C 3/095 |
| 2017/0329192 A1 | 11/2017 | Ono et al. | |
| 2018/0166780 A1 | 6/2018 | Bily et al. | |
| 2018/0218859 A1 * | 8/2018 | Ligtenberg | G06F 3/016 |
| 2019/0210911 A1 * | 7/2019 | Ono | C03B 17/02 |
| 2019/0393600 A1 | 12/2019 | Bily et al. | |
| 2020/0123043 A1 | 4/2020 | Ono et al. | |

FOREIGN PATENT DOCUMENTS

| | | |
|---|---|---|
| JP | 2011-042509 A | 3/2011 |
| JP | 2017-506467 A | 3/2017 |
| JP | 2017-506471 A | 3/2017 |
| KR | 10-2010-0000945 A | 1/2010 |
| WO | WO 2018/051793 A1 | 3/2018 |
| WO | WO2018051793 * | 3/2018 |

OTHER PUBLICATIONS

Extended European Search Report issued Dec. 1, 2021 in European Patent Application No. 19770831.6, 9 pages.

* cited by examiner

SUBSTRATE, LIQUID CRYSTAL ANTENNA AND HIGH-FREQUENCY DEVICE

TECHNICAL FIELD

The present invention relates to substrates and to a liquid-crystal antenna and a high-frequency device each including either of the substrates.

BACKGROUND ART

In communication appliances such as mobile telephones, smartphones, personal digital assistants, and Wi-Fi appliances and other electronic devices including surface acoustic wave (SAW) devices, radar components, and antenna components, the signal frequencies are being shifted to higher frequencies in order to attain an increase in communication capacity, an increase in communication speed, etc. In general, the circuit boards to be used in communication appliances and electronic devices for such high-frequency applications employ insulating substrates such as resin substrates, ceramic substrates, and glass substrates. Such insulating substrates for use in communication appliances and electronic devices for high-frequency applications are required to be reduced in transmission loss due to dielectric loss, conductor loss, etc., in order to ensure the quality and properties such as strength, of high-frequency signals.

As a result of the spread of IoT, various devices have come to have a communicating function and there comes to be the need of mounting communication devices even on products such as motor vehicles, in which radio communication has not been performed so far. It has hence been proposed to mount a communication device such as a liquid-crystal antenna on the roof of a motor vehicle to communicate with satellites (see Patent Documents 1 and 2).

CITATION LIST

Patent Literature

Patent Document 1: JP-T-2017-506467 (The term "JP-T" as used herein means a published Japanese translation of a PCT patent application.)
Patent Document 2: JP-T-2017-506471

SUMMARY OF INVENTION

Technical Problem

For use in high-frequency high-capacity communication, the substrates desirably have stable dielectric characteristics in a wide frequency range. However, conventional resin substrates and glass substrates considerably change in dielectric characteristics in cases when the frequency changes especially in the GHz band, and are hence unsuitable for use as substrates for communication devices.

In antenna applications, communication devices have hitherto been used mainly indoors. However, in cases when liquid-crystal antennas and the like employing conventional resin or glass substrates are attached to motor vehicles, ships, and the like, which are used under wide temperature ranges, the liquid-crystal antennas and the like are thought to be used in a severe environment where the temperature fluctuates considerably. However, the conventional glass substrates used in electronic devices change in dielectric characteristics with temperature change to exert a considerable influence on the circuit and the antenna performance.

Under these circumstances, an object of the present invention is to provide: substrates which can reduce the dielectric loss of high-frequency signals and can be stably used in a wide temperature range; and a liquid-crystal antenna and a high-frequency device each employing either of the substrates.

Solution to the Problem

The present inventors diligently made investigations in order to overcome the problems and, as a result, have discovered that desired dielectric characteristics can be stably obtained regardless of the environment in performing signal processing, by reducing the frequency dependence of dielectric loss tangent or relative permittivity and regulating differences in dielectric loss tangent or relative permittivity in the temperature range of −40 to 150° C. to a value within a certain range. Thus, a substrate can be made suitable for use in various environments such as equatorial regions or cold regions, or for use as substrates for high-frequency circuits, etc.

The present invention provides, in one aspect thereof, a substrate having a dielectric loss tangent (A) as measured at 20° C. and 10 GHz of 0.1 or less,
 a dielectric loss tangent (B) as measured at 20° C. and 35 GHz of 0.1 or less, and
 a ratio represented by [a dielectric loss tangent (C) as measured at an arbitrary temperature in a range of −40 to 150° C. and at 10 GHz]/[the dielectric loss tangent (A)] of 0.90-1.10.

The present invention provides, in another aspect thereof, a substrate having a relative permittivity (a) as measured at 20° C. and 10 GHz of 4 or more and 10 or less,
 a relative permittivity (b) as measured at 20° C. and 35 GHz of 4 or more and 10 or less, and
 a ratio represented by [a relative permittivity (c) as measured at an arbitrary temperature in a range of −40 to 150° C. and at 10 GHz]/[the relative permittivity (a)] of 0.993-1.007.

These substrates are usable in liquid-crystal antennas or high-frequency circuits.

In one aspect of a liquid-crystal antenna and a high-frequency device of the present invention, either of the substrates is included.

Advantageous Effects of the Invention

The substrates of the present invention can be prevented from suffering dielectric characteristics change due to temperature change and can stably reduce the dielectric loss of high-frequency signals in a wide temperature range. The substrates hence make it possible to provide a liquid-crystal antenna and a high-frequency device which have high performance and are practical.

DESCRIPTION OF EMBODIMENTS

Figure 1:
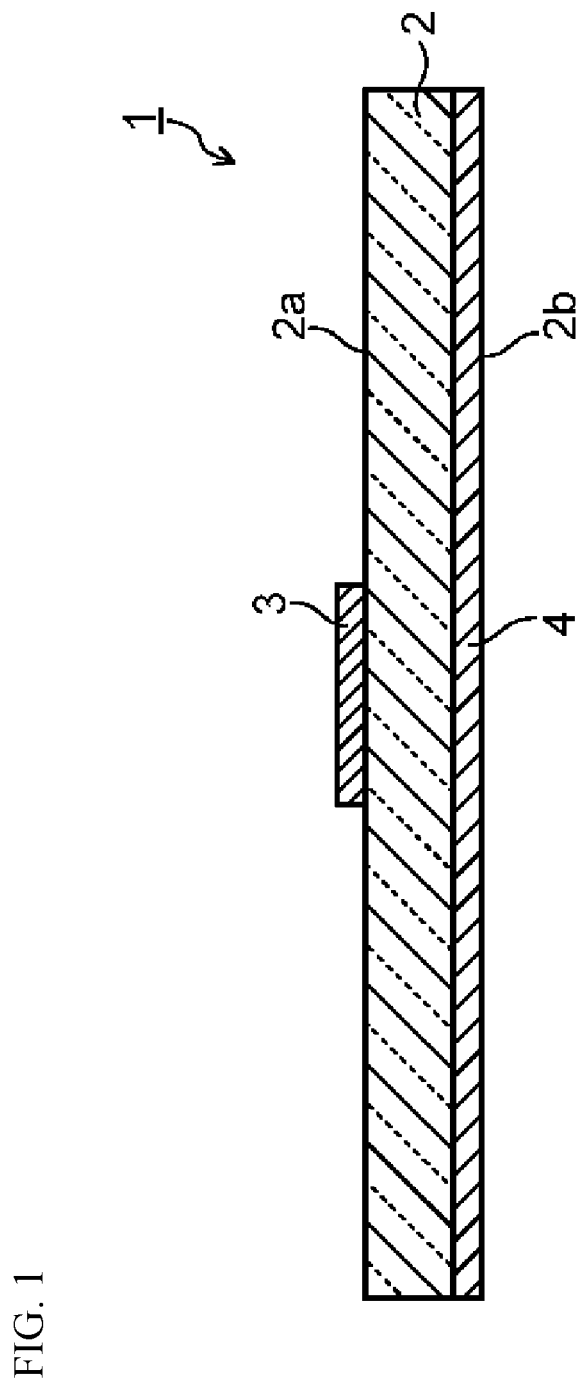
FIG. 1 is a cross-sectional view showing one example of the configuration of a high-frequency circuit.

The present invention will be explained below in detail, but the present invention should not be limited to the following embodiments and can be modified at will within the gist of the present invention. Furthermore, the symbol "-" indicating a numerical range is used as a denotation of a range including the numerical values before and after the symbol "-" as a lower limit value and an upper limit value.

In the case of a substrate which is a glass substrate made of a glass, the contents of components of the glass substrate are each given in mole percentage on an oxide basis unless otherwise indicated. The term "high frequency" means a frequency of 10 GHz or higher, and is preferably higher than 30 GHz, more preferably 35 GHz or higher.

<Substrates>

The substrate of one aspect (hereinafter often referred to as first aspect) of the present invention is characterized by having a dielectric loss tangent (A) as measured at 20° C. and 10 GHz of 0.1 or less and a dielectric loss tangent (B) as measured at 20° C. and 35 GHz of 0.1 or less and having a ratio represented by [a dielectric loss tangent (C) as measured at an arbitrary temperature in a range of −40 to 150° C. and at 10 GHz]/[the dielectric loss tangent (A)] of 0.90-1.10.

The substrate of another aspect (hereinafter often referred to as second aspect) of the present invention is characterized by having a relative permittivity (a) as measured at 20° C. and 10 GHz of 4 or more and 10 or less and a relative permittivity (b) as measured at 20° C. and 35 GHz of 4 or more and 10 or less and having a ratio represented by [a relative permittivity (c) as measured at an arbitrary temperature in the range of −40 to 150° C. and at 10 GHz]/[the relative permittivity (a)] of 0.993-1.007.

By reducing the relative permittivity and/or dielectric loss tangent of a substrate, the dielectric loss in a high-frequency range can be reduced.

The substrate of the first aspect of the present invention has a dielectric loss tangent (tan δ) (A) as measured at 20° C. and 10 GHz of 0.1 or less, preferably 0.05 or less, more preferably 0.01 or less, still more preferably 0.005 or less, especially preferably 0.003 or less.

The substrate of the second aspect of the present invention has a dielectric loss tangent (tan δ) (A) as measured at 20° C. and 10 GHz of preferably 0.1 or less, more preferably 0.05 or less, still more preferably 0.01 or less, yet still more preferably 0.005 or less, especially preferably 0.003 or less.

There is no particular lower limit on the dielectric loss tangent (A), but it is usually 0.0001 or larger.

The substrate of the first aspect of the present invention has a dielectric loss tangent (B) as measured at 20° C. and 35 GHz of 0.1 or less, preferably 0.05 or less, more preferably 0.01 or less, still more preferably 0.005 or less, especially preferably 0.003 or less.

The substrate of the second aspect of the present invention has a dielectric loss tangent (B) as measured at 20° C. and 35 GHz of preferably 0.1 or less, more preferably 0.05 or less, still more preferably 0.01 or less, yet still more preferably 0.005 or less, especially preferably 0.003 or less.

There is no particular lower limit on the dielectric loss tangent (B), but it is usually 0.0001 or larger.

In cases when the value of dielectric loss tangent changes depending on temperature, this substrate causes change in signal characteristics when usage environments of the device is changed, making it impossible to obtain a desired signal strength.

Because of this, the substrate of the first aspect of the present invention has a value obtained by dividing the dielectric loss tangent as measured at an arbitrary temperature in a range of −40 to 150° C. and at 10 GHz by the dielectric loss tangent (A) as measured at 20° C. and 10 GHz, namely, the ratio represented by [dielectric loss tangent (C) as measured at an arbitrary temperature in the range of −40 to 150° C. and at 10 GHz]/[dielectric loss tangent (A)], of 0.90-1.10. The closer the value to 1, the more the substrate is preferred.

Meanwhile, the substrate of the second aspect of the present invention has the ratio represented by [dielectric loss tangent (C) as measured at an arbitrary temperature in the range of −40 to 150° C. and at 10 GHz]/[dielectric loss tangent (A)], of preferably 0.90-1.10. The closer the value to 1, the more the substrate is preferred.

In the case where the substrate is a glass substrate, the dielectric loss tangent can be regulated by changing the glass composition, etc. The dielectric loss tangent can be measured in accordance with the method specified in JIS R1641 (year 2007) using a cavity resonator and a vector network analyzer.

The ratio represented by [dielectric loss tangent (C) as measured at an arbitrary temperature in the range of −40 to 150° C. and at 10 GHz]/[dielectric loss tangent (A)] can be determined by measuring the dielectric loss tangent at 10 GHz at temperature intervals of 10° C. over the range of −40 to 150° C. and calculating the ratio of the maximum and minimum values thereof to the dielectric loss tangent (A) as measured at 20° C. and 10 GHz.

The substrate of the first aspect of the present invention has a relative permittivity (a) as measured at 20° C. and 10 GHz of preferably 10 or less, more preferably 8 or less, still more preferably 6 or less, yet still more preferably 5 or less, especially preferably 4.5 or less. In the substrate of the first aspect of the present invention, there is no particular lower limit on the relative permittivity (a), but it is preferably 4 or higher from the standpoint that such relative permittivity values are effective in attaining device size reduction.

The substrate of the second aspect of the present invention has a relative permittivity (a) as measured at 20° C. and 10 GHz of 10 or less, more preferably 8 or less, still more preferably 6 or less, yet still more preferably 5 or less, especially preferably 4.5 or less. In the substrate of the second aspect of the present invention, a lower limit of the relative permittivity (a) is 4 or higher from the standpoint that such relative permittivity values are effective in attaining device size reduction.

The substrate of the first aspect of the present invention has a relative permittivity (b) as measured at 20° C. and 35 GHz of preferably 10 or less, more preferably 8 or less, still more preferably 6 or less, yet still more preferably 5 or less, especially preferably 4.5 or less. In the substrate of the first aspect of the present invention, there is no particular lower limit on the relative permittivity (b), but it is preferably 4 or higher from the standpoint that such relative permittivity values are effective in attaining device size reduction.

The substrate of the second aspect of the present invention has a relative permittivity (b) as measured at 20° C. and 35 GHz of 10 or less, preferably 8 or less, more preferably 6 or less, still more preferably 5 or less, especially preferably 4.5 or less. In the substrate of the second aspect of the present invention, a lower limit of the relative permittivity (b) is 4 or higher from the standpoint that such relative permittivity values are effective in attaining device size reduction.

In cases when the value of relative permittivity changes depending on temperature, this substrate causes change in signal characteristics when usage environments of the device is changed, making it impossible to obtain a desired signal strength.

Because of this, the substrate of the first aspect of the present invention has the value obtained by dividing the relative permittivity as measured at an arbitrary temperature in the range of −40 to 150° C. and at 10 GHz by the relative permittivity (a) as measured at 20° C. and 10 GHz, namely, the ratio represented by [relative permittivity (c) as measured at an arbitrary temperature in the range of −40 to 150° C. and at 10 GHz]/[relative permittivity (a)], of preferably 0.993-1.007. The closer the value to 1, the more the substrate is preferred.

Meanwhile, the substrate of the second aspect of the present invention has the value obtained by dividing the relative permittivity as measured at an arbitrary temperature in the range of −40 to 150° C. and at 10 GHz by the relative permittivity (a) as measured at 20° C. and 10 GHz, namely, the ratio represented by [relative permittivity (c) as measured at an arbitrary temperature in the range of −40 to 150° C. and at 10 GHz]/[relative permittivity (a)], of 0.993-1.007. The closer the value to 1, the more the substrate is preferred.

In the case where the substrate is a glass substrate, the relative permittivity can be regulated by changing the glass composition, etc. The relative permittivity can be measured in accordance with the method specified in JIS R1641 (year 2007) using a cavity resonator and a vector network analyzer.

The ratio represented by [relative permittivity (c) as measured at an arbitrary temperature in the range of −40 to 150° C. and at 10 GHz]/[relative permittivity (a)] can be determined, as in the case of the dielectric loss tangent, by measuring the relative permittivity at 10 GHz at temperature intervals of 10° C. over the range of −40 to 150° C. and calculating the ratio of the maximum and minimum values thereof to the relative permittivity (a) as measured at 20° C. and 10 GHz.

In the case where the substrates are for use in high-frequency circuits, the substrates each have a Young's modulus of preferably 40 GPa or higher, more preferably 50 GPa or higher, still more preferably 55 GPa or higher, from the standpoint of reducing degree of deflection of the substrate in high-frequency device production steps (wafer process) and thereby inhibiting the occurrence of production failures, etc.

Meanwhile, from the standpoint of diminishing the occurrence of thermal stress due to an abrupt temperature change, the Young's modulus thereof is preferably 70 GPa or less, more preferably 67 GPa or less, still more preferably 64 GPa or less, yet still more preferably 60 GPa or less.

In the case of a glass substrate, the Young's modulus can be regulated by changing the composition of the glass to be used as the substrate. The Young's modulus can be measured by an ultrasonic pulse method in accordance with the method specified in JIS Z 2280 (year 1993).

In cases when either of the substrates is used to configure a semiconductor package or the like as a high-frequency device, the substrate preferably has an average coefficient of thermal expansion at 50-350° C. of 3-15 ppm/° C. from the standpoint that differences in thermal expansion coefficient between this substrate and other members can be easily regulated more suitably. Thus, in configuring, for example, a through glass via (TGV) substrate of the 2.5D or 3D (three-dimensional) mounting type for high-frequency applications, differences in thermal expansion coefficient between this substrate and other members, e.g., semiconductor chips, can be more suitably regulated.

In the case of a glass substrate, the coefficient of thermal expansion thereof can be regulated by changing the contents of, in particular, alkali metal oxides or alkaline-earth metal oxides among the components of the glass. The average coefficient of thermal expansion at 50-350° C. can be determined with a differential thermodilatometer in accordance with the method specified in JIS R3102 (year 1995).

The main surfaces of each substrate are surfaces on which wiring layers are formed in using the substrate, for example, in high-frequency circuits. At least one of the main surfaces preferably has a surface roughness of 1.5 nm or less in terms of arithmetic mean roughness Ra. This is because a wiring layer which is suffering a skin effect can be reduced in the skin resistance even in a high-frequency range exceeding 30 GHz, thereby attaining a reduction in conductor loss. The arithmetic mean roughness Ra of the main surface of the substrate is more preferably 1.0 nm or less, still more preferably 0.5 nm or less. Such surface roughness of the main surface can be attained by subjecting the main surface to a polishing treatment or the like according to need.

In the case where either of the substrates is a glass substrate, the polishing treatment can be, for example, mechanical polishing in which an abrasive material including, for example, cerium oxide, colloidal silica, or the like as a main component and a polishing pad are used, chemical mechanical polishing in which a polishing slurry including an abrasive material and an acidic or alkaline liquid as a dispersion medium and a polishing pad are used, or chemical polishing in which an acidic liquid or an alkaline liquid is used as an etchant. Any of these polishing treatments is used in accordance with the surface roughness of the glass sheet to be used as the material of the glass substrate. For example, preliminary polishing and finish polishing may be used in combination.

Each substrate is not particularly limited in the size or shape thereof. In the case of device production steps for producing a large device or in the case of producing a large number of devices on the same substrate, it is preferable that at least one main surface thereof has the longest portion having a length of 10 cm or larger, and the shortest portion having a length of 5 cm or larger.

The area of at least one main surface thereof is preferably 50 $cm^2$ or larger for improving detection sensitivity in terms of producing devices such as liquid-crystal antennas or for simplifying mounting processes in terms of producing high-frequency devices. The area thereof is more preferably 100 $cm^2$ or larger, still more preferably 225 $cm^2$ or larger. The area thereof is preferably 100,000 $cm^2$ or less from the standpoint of the handleability of the substrate, and is more preferably 10,000 $cm^2$ or less, still more preferably 3,600 $cm^2$ or less.

The thickness of the substrate is preferably 0.05 mm or larger from the standpoint of maintaining, for example, the strength of the substrate during conveyance. The thickness thereof is more preferably 0.1 mm or larger, still more preferably larger than 0.2 mm. By increasing the thickness, the substrate is made to have enhanced ultraviolet-shielding ability, making it possible to protect resins which are deteriorated by ultraviolet light.

Meanwhile, from the standpoints of attaining a thickness reduction or size reduction in high-frequency devices employing high-frequency circuits or in liquid-crystal antennas and the standpoints of attaining an improvement in the efficiency of production thereof, etc., the thickness thereof is preferably 2 mm or less, more preferably 1.0 mm or less, still more preferably 0.7 mm or less, yet still more preferably 0.5 mm or less. By reducing the thickness of the substrate, the substrate is made to have an increased ultraviolet transmittance, making it possible to use an ultraviolet-curable material in steps for producing devices, antennas, etc., thereby heightening the production efficiency.

The substrate has a porosity of preferably 0.1% or less, more preferably 0.01% or less, still more preferably 0.001% or less, from the standpoint that such porosity is effective in producing high-frequency devices inhibited from causing noises, etc. In the case of liquid-crystal antennas, the porosity of the substrate is preferably 0.0001% or less from the standpoint of inhibiting wiring failures due to exposure of open pores in the surface.

The porosity can be determined by examining the bubbles contained in the substrate with an optical microscope, determining the number and diameters of the bubbles, and calculating the volume of bubbles contained per unit volume.

The substrate preferably has a transmittance for light having 350-nm wavelength of 50% or higher, because such transmittance makes it possible to use an ultraviolet-curable material in laminating steps, etc. in producing high-frequency devices, antennas, etc., thereby heightening the production efficiency. The transmittance thereof is more preferably 70% or higher from the standpoints of reducing the period of irradiating the ultraviolet-curable material with ultraviolet light in steps for producing devices, antennas, etc. and reducing the thickness-direction unevenness in curing of the ultraviolet-curable material.

For the same reasons as shown above, the substrate has a transmittance for light having 300-nm wavelength of preferably 50% or higher, more preferably 60% or higher, still more preferably 70% or higher. The substrate has a transmittance for light having 250-nm wavelength of preferably 5% or higher, more preferably 10% or higher, still more preferably 20% or higher.

Meanwhile, in the case of employing members made of resins that are deteriorated by ultraviolet light for producing devices, antennas, and the like, the transmittance for light having 350-nm wavelength is preferably 80% or less, more preferably 60% or less, still more preferably 30% or less, most preferably 10% or less, from the standpoint of imparting ultraviolet-shielding ability to the substrate to enable the substrate to function as a protective material.

For the same reason as shown above, the substrate has a transmittance for light having 300-nm wavelength is preferably 80% or less, more preferably 60% or less, still more preferably 30% or less, yet still more preferably 10% or less. The transmittance for light having 250-nm wavelength is preferably 60% or less, more preferably 30% or less, still more preferably 10% or less, yet still more preferably 5% or less.

The light transmittances of the substrate for the respective wavelengths can be measured with a visible-ultraviolet spectrophotometer, and external transmittances including a loss due to reflection are used.

The substrates of the present invention are not particularly limited in the kind thereof so long as the substrates have the properties described above. The substrates each can be any of a resin substrate, a ceramic substrate, and a glass substrate. For the glass substrate, it is only required to be a substrate constituted of a nonmetallic inorganic solid which is amorphous and shows a glass transition, and more preferably is a substrate constituted of an oxide glass. Incidentally, neither a crystallized glass which is a mixture of a glass and a crystalline substance nor a sintered glass containing a crystalline filler is included. The crystallinity of a glass may be determined, for example, by X-ray diffractometry. In cases when a glass is examined by X-ray diffractometry and no clear diffraction peak is observed, then this glass can be ascertained to be amorphous.

In the case where either of the substrates is a glass substrate, the glass substrate preferably has a β-OH value of 0.05-0.8 $mm^{-1}$. β-OH is a value used as an index to the water content of glass, and is determined by examining the glass substrate for the absorbance of light having a wavelength of 2.75-2.95 μm and dividing the maximum value $β_{max}$ thereof by the thickness (mm) of the substrate.

Regulating the β-OH value thereof to 0.8 $mm^{-1}$ or less is preferred because this enables the substrate to have further improved low-dielectric-loss characteristics. The β-OH value thereof is more preferably 0.6 $mm^{-1}$ or less, still more preferably 0.5 $mm^{-1}$ or less, yet still more preferably 0.4 $mm^{-1}$ or less.

Meanwhile, regulating the β-OH value of the substrate to 0.05 $mm^{-1}$ or larger is preferred because this is effective in heightening glass production efficiency and enhancing property of bubbles, etc. without necessity of melting in an extreme dry atmosphere or highly reducing the water content of raw materials. The β-OH value thereof is more preferably 0.1 $mm^{-1}$ or larger, still more preferably 0.2 $mm^{-1}$ or larger. The β-OH value can be regulated by changing the composition of the glass for the substrate or selecting raw materials for the glass.

The glass substrate preferably has a devitrification temperature of 1,400° C. or lower. In cases when the devitrification temperature thereof is 1,400° C. or lower, the forming equipment can be made to have lower member temperatures in forming the glass, making it possible to prolong the lives of the members. The devitrification temperature thereof is more preferably 1,350° C. or lower, still more preferably 1,330° C. or lower, especially preferably 1,300° C. or lower.

The devitrification temperature of a glass is determined by placing crushed particles of the glass on platinum dishes, heat-treating the glass particles for 17 hours in electric furnaces each having a controlled constant temperature, examining the heat-treated samples with an optical microscope to measure a maximum temperature at which crystal precipitation has occurred in the surface of or inside the glass and a minimum temperature at which crystal precipitation has not occurred, and averaging the maximum and minimum temperatures.

Although a process for producing a substrate will be described later in detail, a glass substrate is formed by melting glass raw materials and hardening the melt. Methods for producing the substrate are not particularly limited. However, use can be made of, for example, a method in which a general molten glass is formed by the float process into a sheet having a given thickness, annealed, and then cut into a desired shape to obtain a sheet glass.

The composition of the glass constituting the glass substrate is explained below. In this description, the expression "substantially not contained" means that the glass does not contain a component other than the component mixed therein as unavoidable impurities from raw materials, etc. Namely, that expression means that the component is not purposely incorporated, and the content thereof is about 0.1% by mole or less. However, the content thereof is not limited to such values.

It is preferable that the glass includes $SiO_2$ as a main component. In this description, the expression "as a main component" means that the content of $SiO_2$ is the highest among the contents of components in mole percentage on an oxide basis. $SiO_2$ is a network-forming substance. The content thereof is more preferably 40% or higher, still more preferably 45% or higher, yet still more preferably 50% or higher, especially preferably 55% or higher, because such $SiO_2$ contents are effective in improving the glass-forming ability and weatherability and in inhibiting devitrification. Meanwhile, from the standpoint of attaining satisfactory glass meltability, the content thereof is preferably 75% or less, more preferably 74% or less, still more preferably 73% or less, yet still more preferably 72% or less.

The total content of $Al_2O_3$ and $B_2O_3$ (the content of $Al_2O_3$ may be 0) is preferably 1% or higher, more preferably 3% or higher, still more preferably 5% or higher, yet still more preferably 7% or higher, because such total contents are effective in enhancing the meltability of the glass, etc. Meanwhile, the total content of $Al_2O_3$ and $B_2O_3$ is preferably 40% or less, more preferably 37% or less, still more preferably 35% or less, yet still more preferably 33% or less, because such total contents are effective in heightening the low-dielectric-loss characteristics of the substrate while maintaining the meltability of the glass, etc.

The content molar ratio represented by $\{Al_2O_3/(Al_2O_3+B_2O_3)\}$ is preferably 0.45 or less, more preferably 0.4 or less, still more preferably 0.3 or less, because such content molar ratios are effective in enhancing the low-dielectric-loss characteristics of the glass substrate. The content molar ratio represented by $\{Al_2O_3/(Al_2O_3+B_2O_3)\}$ is preferably 0 or larger (including 0), more preferably 0.01 or larger, still more preferably 0.05 or larger.

The content of $Al_2O_3$ is preferably 15% or less, more preferably 14% or less, still more preferably 10% or less, because such $Al_2O_3$ contents are effective in improving the meltability of the glass, etc. Although the glass need not contain $Al_2O_3$, the content of $Al_2O_3$, when it is contained, is more preferably 0.5% or higher, since $Al_2O_3$ is a component effective in improving the weatherability, inhibiting the glass from separating into phases, reducing the coefficient of thermal expansion, etc.

The content of $B_2O_3$ is preferably 30% or less, more preferably 28% or less, still more preferably 26% or less, yet still more preferably 24% or less, especially preferably 23% or less, because such $B_2O_3$ contents are effective in making the acid resistance and the strain point satisfactory. Meanwhile, since $B_2O_3$ is a component effective in improving the melting reactivity, lowering the devitrification temperature, etc., the content thereof is preferably 9% or higher, more preferably 13% or higher, still more preferably 16% or higher.

Examples of alkaline-earth metal oxides include MgO, CaO, SrO, and BaO. These alkaline-earth metal oxides each function as a component which enhances the melting reactivity of the glass. The total content of such alkaline-earth metal oxides is preferably 13% or less, more preferably 11% or less, still more preferably 10% or less, yet still more preferably 8% or less, especially preferably 6% or less, because such total contents are effective in enhancing the low-dielectric-loss characteristics of the glass substrate. Meanwhile, from the standpoint of keeping the meltability of the glass satisfactory, the total content of alkaline-earth metal oxides is preferably 0.1% or higher, more preferably 3% or higher, still more preferably 5% or higher.

Although MgO is not essential, it is a component which can heighten the Young's modulus without increasing the specific gravity. That is, MgO is a component capable of heightening the specific modulus. By incorporating MgO, the problem of deflection can be alleviated and the fracture toughness value can be improved to enhance the glass strength. MgO is also a component which improves the meltability. Although MgO is not an essential component, the content thereof is preferably 0.1% or higher, more preferably 1% or higher, still more preferably 3% or higher, because such MgO contents can sufficiently provide the effects of MgO incorporation and are effective in inhibiting the coefficient of thermal expansion from becoming too low. Meanwhile, from the standpoint of inhibiting the devitrification temperature from rising, the content of MgO is preferably 13% or less, more preferably 11% or less, still more preferably 9% or less.

CaO has a characteristics of heightening the specific modulus second behind MgO among the alkaline-earth metal oxides, and of not excessively lowering the strain point. Like MgO, CaO is a component which improves the meltability. CaO is also a component characterized by being less prone to heighten the devitrification temperature as compared with MgO. Although CaO is not an essential component, the content thereof is preferably 0.1% or higher, more preferably 1% or higher, still more preferably 3% or higher, because such CaO contents can sufficiently provide the effects of CaO incorporation. Meanwhile, from the standpoints of preventing the average coefficient of thermal expansion from becoming too high and of inhibiting the devitrification temperature from rising and thereby preventing the glass from devitrifying when produced, the content of CaO is preferably 13% or less, more preferably 10% or less, still more preferably 8% or less.

SrO is a component which improves the meltability of the glass without heightening the devitrification temperature thereof. Although SrO is not an essential component, the content thereof is preferably 0.1% or higher, more preferably 0.5% or higher, still more preferably 1% or higher, yet still more preferably 1.5% or higher, especially preferably 2% or higher, because such SrO contents can sufficiently provide the effect of SrO incorporation. Meanwhile, the content of SrO is preferably 13% or less, more preferably 10% or less, still more preferably 7% or less, especially preferably 5% or less, because such SrO contents are effective in inhibiting the average coefficient of thermal expansion from becoming too high without excessively increasing the specific gravity.

Although BaO is not essential, it is a component which improves the meltability of the glass without elevating the devitrification temperature thereof. However, the glass containing a large amount of BaO tends to have a large specific gravity, a reduced Young's modulus, a heightened relative permittivity, and too high average coefficient of thermal expansion. Consequently, the content of BaO is preferably 10% or less, more preferably 8% or less, still more preferably 5% or less, yet still more preferably 3% or less. It is especially preferable that BaO is substantially not contained.

Examples of alkali metal oxides include $Li_2O$, $Na_2O$, $K_2O$, $Rb_2O$, and $Cs_2O$. The total content of such alkali metal oxides is preferably 5% or less, more preferably 3% or less, still more preferably 1% or less, yet still more preferably 0.2% or less, especially preferably 0.1% or less, most preferably 0.05% or less, from the standpoint of heightening the low-dielectric-loss characteristics of the glass substrate. Meanwhile, the total content thereof is preferably 0.001% or higher, more preferably 0.002% or higher, still more preferably 0.003% or higher, yet still more preferably 0.005% or higher, because such total contents are effective in obtaining practical glass meltability and glass substrate production efficiency without necessitating excessive raw-material purification and in regulating the coefficient of thermal expansion of the glass substrate.

$Na_2O$ and $K_2O$ are especially important among those alkali metal oxides, and it is preferable that the total content of $Na_2O$ and $K_2O$ is in the range of 0.001-5%. The incorporation of $Na_2O$ and $K_2O$ in combination is preferred because this inhibits alkali components from moving and is hence effective in enhancing the low-dielectric-loss characteristics of the glass substrate. That is, the content molar ratio represented by $\{Na_2O/(Na_2O+K_2O)\}$ is preferably 0.01-0.99, more preferably 0.98 or less, still more preferably 0.95 or less, yet still more preferably 0.9 or less. Meanwhile, the content molar ratio represented by $\{Na_2O/(Na_2O+K_2O)\}$ is preferably 0.02 or larger, more preferably 0.05 or larger, still more preferably 0.1 or larger.

Besides containing the components described above, the glass may contain, for example, $Fe_2O_3$, $TiO_2$, $ZrO_2$, $ZnO$, $Ta_2O_5$, $WO_3$, $Y_2O_3$, $La_2O_3$, etc. as optional components. Of these, $Fe_2O_3$ is a component which governs the light-absorbing performances, e.g., infrared-absorbing performance and ultraviolet-absorbing performance, of the glass substrate. According to need, Fe can be incorporated in an amount up to 0.012% in terms of $Fe_2O_3$ amount. In cases when the content of Fe is 0.012% or less, the low-dielectric-loss characteristics and ultraviolet transmittance of the glass substrate can be maintained. In the case where the glass contains Fe, the content thereof is more preferably 0.01% or less, still more preferably 0.005% or less, from the standpoint of improving the ultraviolet transmittance. Heightening the ultraviolet transmittance of the glass substrate makes it possible to use an ultraviolet-curable material in laminating steps, etc. in producing high-frequency devices, antennas, etc., thereby heightening the efficiency of producing the high-frequency devices, antennas, etc.

Meanwhile, it is preferable that the glass substrate contains Fe in an amount of 0.05% or larger in terms of $Fe_2O_3$ amount according to need, because this can enhance the ultraviolet-shielding ability. The content of Fe is more preferably 0.07% or higher, still more preferably 0.1% or higher. By thus enhancing the ultraviolet-shielding ability of the glass substrate, the glass substrate can be made to function as a protective material in cases when resins which are deteriorated by ultraviolet light are used as members.

<Process for Producing Substrate>

(Glass Substrate)

A glass substrate can be obtained by a production process including: a melting step in which raw materials for glass are heated to obtain a molten glass; a refining step in which the molten glass is degassed; a forming step in which the molten glass is formed into a sheet shape to obtain a glass ribbon; and an annealing step in which the glass ribbon is gradually cooled to a room-temperature state. A glass substrate may be produced also by forming the molten glass into a block shape and subjecting the formed glass to annealing and then to cutting and polishing.

In the melting step, raw materials are prepared so as to result in a desired glass-substrate composition, continuously introduced into a melting furnace, and heated preferably at about 1,450° C.-1,750° C. to obtain a molten glass.

Usable as the raw materials are oxides, carbonates, nitrates, hydroxides, halides including chlorides, etc. In the case where the melting or refining step includes a step in which the molten glass comes into contact with platinum, there are cases where minute platinum particles are released into the molten glass and undesirably come as contamination into the glass substrate to be obtained. The use of raw-material nitrates has the effect of preventing the formation of platinum contamination.

Usable as the nitrates are strontium nitrate, barium nitrate, magnesium nitrate, calcium nitrate, and the like. It is more preferred to use strontium nitrate. With respect to raw-material particle sizes, use can be suitably made of raw materials ranging from a particle diameter which is large, e.g., several hundred micrometers, to such a degree that the particles do not remain unmelted, to a particle diameter which is small, e.g., about several micrometers, to such a degree that the particles neither fly off during raw-material conveyance nor aggregate to form secondary particles. Particles formed by granulation are also usable.

The moisture contents of raw materials can be suitably regulated in order to prevent the raw materials from flying off. Melting conditions including 13-OH value and the degree of Fe oxidation-reduction (redox $[Fe^{2+}/(Fe^{2+}+Fe^{3+})]$) can be suitably regulated before the raw materials are used.

The refining step is a step for degassing the molten glass obtained in the melting step. In the refining step, use may be made of a method of degassing by depressurization or a method in which the molten glass is degassed by heating to a temperature higher than the temperature used for melting the raw materials. In steps for producing glass substrates of embodiments, $SO_3$ or $SnO_2$ can be used as a refining agent.

Preferred $SO_3$ sources are sulfates of at least one element selected from the group consisting of Al, Na, K, Mg, Ca, Sr, and Ba. More preferred are sulfates of alkaline-earth metals. Especially preferred of these are $CaSO_4 \cdot 2H_2O$, $SrSO_4$, and $BaSO_4$, which are highly effective in enlarging the bubbles.

In the method of degassing by depressurization, it is preferred to use a halogen such as Cl or F, as a refining agent.

Preferred Cl sources are chlorides of at least one element selected from the group consisting of Al, Mg, Ca, Sr, and Ba. More preferred are chlorides of alkaline-earth metals. Especially preferred of these are $SrCl_2 \cdot 6H_2O$ and $BaCl_2 \cdot 2H_2O$, because these chlorides are highly effective in enlarging the bubbles and have low deliquescence.

Preferred F sources are fluorides of at least one element selected from the group consisting of Al, Na, K, Mg, Ca, Sr, and Ba. More preferred are fluorides of alkaline-earth metals. Preferred of these is $CaF_2$, which is highly effective in enhancing the meltability of the raw materials for glass.

Tin compounds represented by $SnO_2$ evolve $O_2$ gas in the glass melt. In the glass melt, $SnO_2$ is reduced to SnO at temperatures not lower than 1,450° C. to evolve $O_2$ gas and thereby have the function of considerably enlarging the bubbles. In producing glass substrates of embodiments, raw materials for glass are melted by heating to about 1,450-1,750° C. and, hence, the bubbles in the glass melt are more effectively enlarged.

In the case of using $SnO_2$ as a refining agent, the amount of tin compounds in the raw materials is regulated such that the content thereof is 0.01% or higher in terms of $SnO_2$ amount with respect to the total amount of the base composition described above taken as 100%. Regulating the $SnO_2$ content to 0.01% or higher is preferred because the refining function is obtained in melting the raw materials for glass. The content of $SnO_2$ is more preferably 0.05% or higher, still more preferably 0.10% or higher. Meanwhile, regulating the $SnO_2$ content to 0.3% or less is preferred because the glass is inhibited from having a color or devitrifying. The content of tin compounds in the alkali-free glass is more preferably 0.25% or less, still more preferably 0.2% or less, especially preferably 0.15% or less, in terms of $SnO_2$ amount with respect to the total amount of the base composition taken as 100%.

The forming step is a step in which the molten glass which has been degassed in the refining step is formed into a sheet shape to obtain a glass ribbon. In the forming step, known methods for forming a glass into a sheet shape can be used, such as a float process in which a molten glass is poured onto a molten metal, e.g., tin, and thereby formed into a sheet shape to obtain a glass ribbon, an overflow downdraw process (fusion process) in which a molten glass is caused to flow downward from a trough-shaped member, and a slit downdraw process in which a molten glass is caused to flow downward through a slit.

The annealing step is a step in which the glass ribbon obtained in the forming step is cooled to a room-temperature state under controlled cooling conditions. In the annealing step, the glass ribbon is cooled so that in the temperature range of from the annealing point to the strain point of the formed glass, the glass ribbon is cooled at a given average cooling rate R (° C./min) and that the glass ribbon is further cooled gradually to a room-temperature state under given conditions. The annealed glass ribbon is cut to obtain a glass substrate.

In case where the cooling rate R in the annealing step is too high, the cooled glass is prone to have a residual strain therein. In addition, the too high cooling rate R results in an increase in equivalent cooling rate, which is a parameter reflecting virtual temperature, making it impossible to obtain low-dielectric-loss characteristics. It is hence preferred to set the R so as to result in an equivalent cooling rate of 800° C./min or less. The equivalent cooling rate is more preferably 400° C./min or less, still more preferably 100° C./min or less, especially preferably 50° C./min or less. Meanwhile, in case where the cooling rate is too low, the step requires too long a time period, resulting in a decrease in production efficiency. It is hence preferred to set the R so as to result in an equivalent cooling rate of 0.1° C./min or higher. The equivalent cooling rate is more preferably 0.5° C./min or higher, still more preferably 1° C./min or higher.

A definition of the equivalent cooling rate and a method for evaluation thereof are as follows.

A glass having a composition to be examined, which has been processed into rectangular parallelepipeds having dimensions of 10 mm×10 mm×0.3-2.0 mm, is held at [strain point]+170° C. for 5 minutes using an infrared heating type electric furnace and then cooled to room temperature (25° C.). In this operation, cooling rates ranging from 1° C./min to 1,000° C./min are used for the cooling to produce a plurality of glass samples.

A precision refractometer (e.g., KPR2000, manufactured by Shimadzu Device Corp.) is used to measure the refractive index $n_d$ for d-line (wavelength, 587.6 nm) of each of the plurality of glass samples. For the measurement, a V-block method or a minimum deviation method may be used. The obtained values of $n_d$ are plotted against the logarithm of cooling rate, thereby obtaining a calibration curve showing a relationship between $n_d$ and the cooling rate.

Next, the $n_d$ of a glass having the same composition actually produced by the steps of melting, forming, cooling, etc. is measured by the measuring method shown above. A corresponding cooling rate which corresponds to the measured value of $n_d$ (in this embodiment, the corresponding cooling rate is referred to as equivalent cooling rate) is determined from the calibration curve.

In the process for producing a glass substrate, it is preferable that the glass melt is sufficiently stirred during the production somewhere in the conveying pipeline for the glass melt to attain a narrower temperature distribution during the annealing after sheet forming. This is because the narrower temperature distribution can further reduce the ranges of in-plane fluctuations in dielectric loss tangent and relative permittivity at 20° C. and 10 GHz.

Although a process for producing a glass substrate was described above, production processes are not limited to the embodiment. Modifications, improvements, etc. within a range where the objects of the invention can be attained are included in the present invention. For example, in producing a glass substrate of the present invention, a molten glass may be directly formed into a sheet shape by press molding.

In the case of producing a glass substrate of the present invention, besides a production process in which a melting furnace made of a refractory material is used, the glass substrate may be produced by a method in which a crucible made of platinum or an alloy including platinum as a main component (hereinafter referred to as platinum crucible) is used as a melting furnace or a clarifier. In the case of using a platinum crucible in a melting step, raw materials are prepared so as to result in the composition of the glass substrate to be obtained and the platinum crucible containing the raw materials is heated in an electric furnace preferably to about 1,450° C.-1,700° C. A platinum stirrer is inserted thereinto to stir the contents for 1-3 hours to obtain a molten glass.

In a forming step in glass sheet production steps in which a platinum crucible is used, the molten glass is poured, for example, on a carbon board or into a mold and is thereby formed into a sheet or block shape. In an annealing step, the formed glass is held typically at a temperature higher than the glass transition point Tg by about 50° C., thereafter cooled to around the strain point at a rate of about 1-10° C./min, and then cooled to a room-temperature state at a cooling rate which does not result in a residual strain. The glass sheet or block is then cut into a given shape and polished, thereby obtaining a glass substrate. The glass substrate obtained by the cutting may be heated to, for example, a temperature of about Tg+50° C. and then gradually cooled to a room-temperature state at a given cooling rate. Thus, the equivalent cooling temperature of the glass can be regulated.

<High-Frequency Circuit, Liquid-Crystal Antenna>

The substrate of the present invention is suitable for use as a substrate for circuit boards for high-frequency devices (electronic devices) such as semiconductor devices for use in, for example, communication appliances such as mobile telephones, smartphones, personal digital assistants, and Wi-Fi appliances, surface acoustic wave (SAW) devices, radar components such as radar transceivers, etc. and suitable for use as a substrate for components of antennas such as liquid-crystal antennas, etc. The substrate of the present invention is more suitable for use as a substrate for high-frequency circuits to be used in high-frequency devices and for liquid-crystal antennas, because the substrate is especially effective in reducing the dielectric loss of high-frequency signals and achieving stable characteristics over a wide temperature range.

In the case of the substrate for high-frequency circuits, the present invention is especially suitable for high-frequency devices in which high-frequency signals, especially signals having a frequency higher than 30 GHz, in particularly, a frequency of 35 GHz or higher, are handled. By using the substrates of the present invention as substrates for high-frequency circuits for such high-frequency devices, the transmission loss of high-frequency signals can be reduced, making it possible to improve the quality, strength, and other properties of high-frequency signals.

The substrates of the present invention are suitable also for use as perforated substrates produced using, for example, a laser. The substrates not only are effective in improving the quality, strength, and other properties of high-frequency signals as stated above but also have high resistance to thermal shocks during perforation.

An example (cross-sectional view) of the configuration of a high-frequency circuit for use in high-frequency devices is shown in FIG. 1. The circuit board 1 includes a substrate 2 having insulating properties, a first wiring layer 3 formed on a first main surface 2a of the substrate 2, and a second wiring layer 4 formed on a second main surface 2b of the substrate 2. The first and second wiring layers 3 and 4 form microstrip lines as an example of transmission lines. The first wiring layer 3 constitutes a signal line, and the second wiring layer 4 constitutes a ground line. However, the structures of the first and second wiring layers 3 and 4 are not limited to those, and the wiring layers may have been formed on only either of the main surfaces of the substrate 2.

The first and second wiring layers 3 and 4 are layers each constituted of a conductor, and the thickness thereof is usually about 0.1-50 μm. The conductors constituting the first and second wiring layers 3 and 4 are not particularly limited, and use is made of, for example, a metal such as copper, gold, silver, aluminum, titanium, chromium, molybdenum, tungsten, platinum, or nickel, an alloy or metal compound containing at least one of these metals, etc.

The structures of the first and second wiring layers 3 and 4 are not limited to single-layer structures, and the first and second wiring layers 3 and 4 each may have a multilayer structure such as a laminated structure composed of a titanium layer and a copper layer. Methods for forming the first and second wiring layers 3 and 4 are not particularly limited, and use can be made of any of various known formation methods such as a printing method using a conductor paste, dipping method, plating, vapor deposition, and sputtering.

By using the substrate of the present invention in high-frequency circuits, the circuit boards can be reduced in transmission loss at high-frequencies. Specifically, the transmission loss at a frequency of, for example, 35 GHz can be reduced to preferably 1 dB/cm or less, more preferably 0.5 dB/cm or less. Consequently, the quality, strength, and other properties of high-frequency signals, in particular, high-frequency signals having a frequency exceeding 30 GHz, especially a frequency of 35 GHz or higher, are maintained. It is hence possible to provide substrates and circuit boards which are suitable for high-frequency devices in which such high-frequency signals are handled. Thus, the characteristics and quality of high-frequency devices in which high-frequency signals are handles can be improved.

Furthermore, since the substrates of the present invention show stable properties over a wide temperature range, the substrates are suitable also for use in high-frequency devices to be used in hot regions or cold regions or in regions where temperature fluctuations are severe, such as deserts, etc.

Meanwhile, among substrates for high-frequency circuits, there are substrates called universal substrates or perforated substrates, etc. Such a substrate includes an insulating sheet of base material that has through holes and copper-foil lands which have been formed thereon in a regular pattern (e.g., lattice pattern) arrangement and that further has copper-foil wiring lines formed thereon by etching which connect several of the lands. A laser is used for forming the through holes and for the etching. Examples of the laser include an excimer laser, an infrared laser, a $CO_2$ laser, and a UV laser.

A liquid-crystal antenna is an antenna for satellite communication which can be controlled with respect to the direction of radio waves to be transmitted or received, using the liquid-crystal technology. Liquid-crystal antennas are suitable for use mainly on vehicles such as ships, airplanes, and motor vehicles. Since liquid-crystal antennas are expected to be used mainly outdoors, the liquid-crystal antennas are required to have stable properties in a wide temperature range. Examples of the wide temperature range include temperature differences between on the ground and in the sky, temperature differences in deserts between day and night, use in squalls in scorching deserts, use in hot regions, and use in cold regions.

Since the substrates of the present invention can provide stable properties over such wide temperature ranges, use thereof in liquid-crystal antennas is also preferred.

EXAMPLES

The present invention is explained below in detail by reference to Examples, but the present invention is not limited thereto.

Examples 1 to 26

Glass substrates having the compositions shown in Tables 1 to 4 and having thicknesses of 0.5-10 mm and a shape of 50×50 mm were prepared. The glass substrates were produced by a melting method using a platinum crucible. Raw materials including silica sand were mixed together so as to result in a glass amount of 1 kg, thereby preparing each batch. Thereto were added 0.1%-1% of sulfate in terms of $SO_3$ amount, 0.16% of F, and 1% of Cl in mass percentage on an oxide basis, with respect to 100% of the raw materials for the desired composition.

The raw materials were placed in the platinum crucible and melted by heating in an electric furnace at a temperature of 1,650° C. for 3 hours to obtain a molten glass. In the melting, a platinum stirrer was inserted into the platinum crucible to stir the melt for 1 hour, thereby homogenizing the glass. The molten glass was poured onto a carbon plate and formed into a sheet shape, and the sheet-shaped glass was placed in an electric furnace having a temperature of about Tg+50° C. and held therein for 1 hour. The electric furnace was thereafter cooled to Tg−100° C. at a cooling rate of 1° C./min and then allowed to cool until the glass cooled to room temperature. The glass was thereafter cut and polished to obtain a glass sheet.

The end surfaces were chamfered (C/R chamfering) with a chamfering device. Examples of the glass sheet chamfering device include the device described in JP-A-2008-49449, which is a device for chamfering glass sheet end surfaces using a rotary grindstone. The rotary grindstone may be either a resin-bonded grindstone or a metal-bonded grindstone. Examples of abrasive grains for use in such grindstones include any one of diamond, cubic boron nitride (CBN), alumina ($Al_2O_3$), silicon carbide (SiC), pumice, garnet, and the like or a combination of two or more thereof.

In Tables 1 to 4, Total RO[*1] means the total content of alkaline-earth metal oxides (MgO+CaO+SrO+BaO), and Total $R_2O$[*2] means the total content of alkali metal oxides ($Na_2O+K_2O$).

Examples 27 and 28

Resin substrates constituted of polyimide resins (Kapton H (manufactured by Du Pont-Toray Co., Ltd.) and Upilex S50 (manufactured by Ube Industries, Ltd.)) were produced.

The substrates obtained were examined for dielectric loss tangent (20° C.) at 35 GHz, dielectric loss tangent (−40 to 150° C.) at 10 GHz, relative permittivity (20° C.) at 35 GHz, relative permittivity (−40 to 150° C.) at 10 GHz, average coefficient of thermal expansion at 50-350° C., Young's modulus, porosity, transmittance for light having 350-nm wavelength, β-OH value, density, specific modulus, and devitrification temperature.

The results are shown in Tables 5 to 9. In the tables, each numeral given in parentheses is a value determined by calculation, and "-" indicates that no measurement was made.

The methods used for determining the properties are shown below.

(Relative Permittivity, Dielectric Loss Tangent)

In accordance with the method specified in JIS R1641 (year 2007), a measurement was made with a cavity resonator and a vector network analyzer. The measuring frequencies were 35 GHz and 10 GHz, which were air resonance frequencies for the cavity resonator. The samples for examination at 35 GHz had a flat sheet shape having dimensions of 40 mm□×thickness 0.3-0.4 mm, and the samples for examination at 10 GHz had a strip shape having dimensions of 3 mm×60 mm×thickness 0.4-0.6 mm. The cavity resonator was disposed in a thermostatic chamber to regulate the measuring temperature. The measuring temperature for examination at 35 GHz was 20° C., and the measuring temperature for examination at 10 GHz was changed at intervals of 10° C. over the range of −40 to 150° C. With respect to Examples 27 and 28 which were the resin substrates, the substrates were held at 120° C. for 2 hours for dehumidification and then stored in a dry container to exclude any influence of moisture absorption, before being subjected to the temperature measurements.

Figure 2:
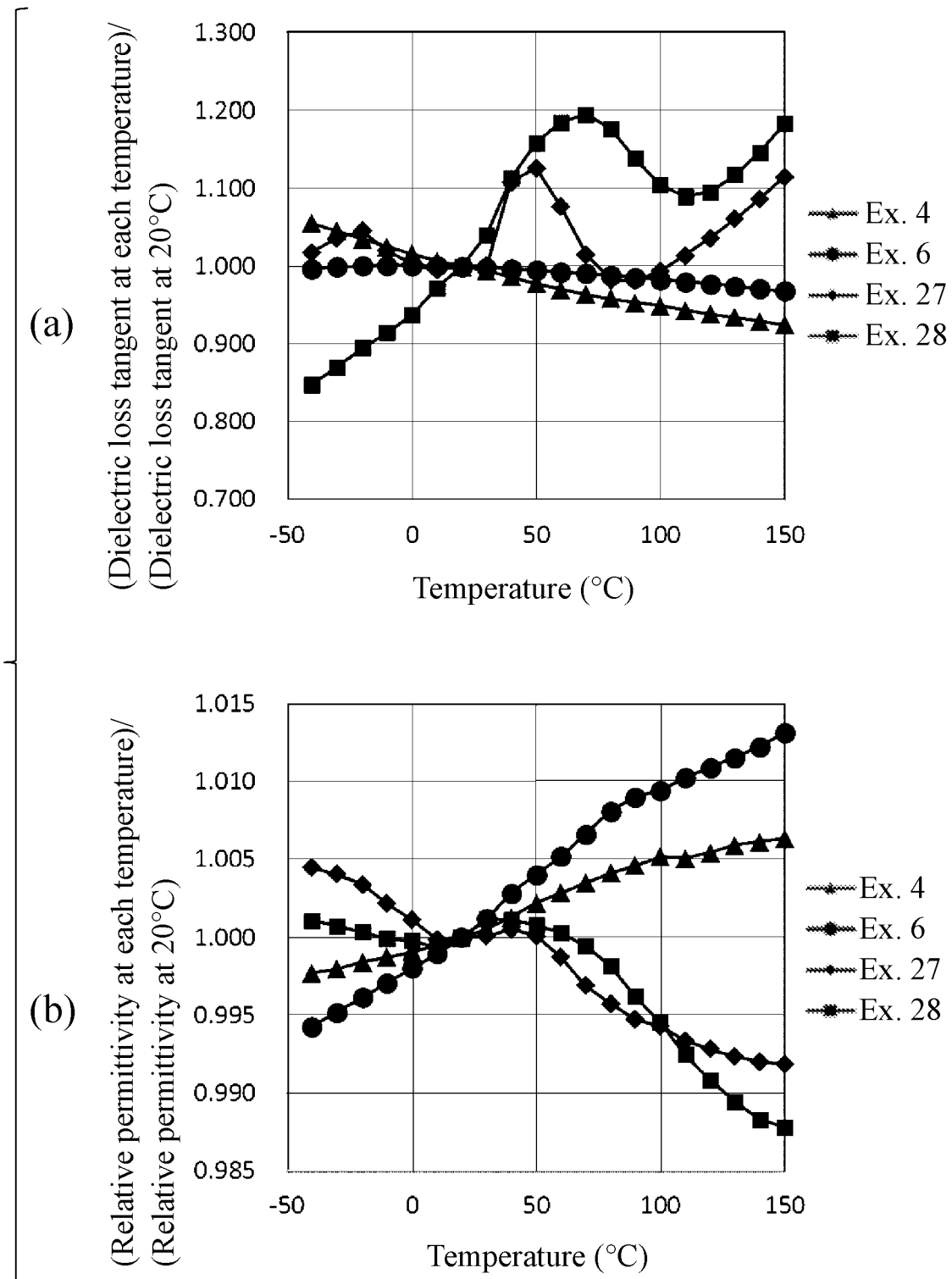
FIG. 2 shows charts of the temperature dependence of dielectric loss tangent ((a) of FIG. 2) and the temperature dependence of relative permittivity ((b) of FIG. 2), at 10 GHz in each of various substrates.

"Dielectric loss tangent @ 10 GHz" and "Relative permittivity @ 10 GHz" in Tables 5 to 8 show values measured at 20° C. In (a) of FIG. 2 are shown results obtained by dividing each of the values of dielectric loss tangent at 10 GHz measured at internals of 10° C. over the range of −40 to 150° C. by the value of dielectric loss tangent measured at 20° C. and 10 GHz and plotting the resultant quotient values to evaluate the temperature dependence of dielectric loss tangent. In (b) of FIG. 2 are shown results obtained by dividing each of the values of relative permittivity at 10 GHz measured at internals of 10° C. over the range of −40 to 150° C. by the value of relative permittivity measured at 20° C. and 10 GHz and plotting the resultant quotient values to evaluate the temperature dependence of relative permittivity.

(Average Coefficient of Thermal Expansion)

In accordance with the method specified in JIS R3102 (year 1995), a differential thermodilatometer was used to conduct a measurement in the temperature range of 50–350° C. The unit is ppm/° C.

(Young's Modulus)

In accordance with the method specified in JIS Z 2280, a glass having a thickness of 0.5-10 mm was examined by an ultrasonic pulse method. The unit is GPa.

(Porosity)

The porosity of a glass substrate was determined by examining the bubbles contained therein with an optical microscope, determining the number and diameters of the bubbles, and calculating the volume of bubbles contained per unit volume.

(Transmittance)

The transmittance of a mirror-polished glass having a given thickness was measured with a visible-ultraviolet spectrophotometer. The external transmittance including a loss due to reflection was measured as the transmittance and was shown as a converted value corresponding to a glass thickness of 0.3-0.4 mm.

(β-OH Value)

β-OH values were determined by the method described in the embodiment shown above. The unit is $mm^{-1}$.

(Density)

A glass lump weighing about 20 g and containing no bubbles was examined for density by Archimedes method. The unit is $g/cm^3$.

(Devitrification Temperature)

The devitrification temperature of a glass was determined by placing crushed particles of the glass on platinum dishes, heat-treating the glass particles for 17 hours in electric furnaces each having a controlled constant temperature, examining the heat-treated samples with an optical microscope to measure a maximum temperature at which crystal precipitation had occurred inside the glass and a minimum temperature at which crystal precipitation had not occurred, and averaging the maximum and minimum temperatures.

(Specific Modulus)

The specific modulus was determined by calculation from the measured values of density and Young's modulus. The unit is $GPa \cdot cm^3/g$.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Composition [mol %] | $SiO_2$ | 68.0 | 69.5 | 71.0 | 62.0 | 71.1 | 66.1 | 100 |
| | $Al_2O_3$ | 4.0 | 5.5 | 4.0 | 8.0 | 1.1 | 11.3 | 0 |
| | $B_2O_3$ | 21.0 | 15.0 | 21.3 | 23.0 | 0.0 | 7.8 | 0 |
| | $Al_2O_3 + B_2O_3$ | 25.0 | 20.5 | 25.3 | 31.0 | 1.1 | 19.1 | 0 |
| | MgO | 0.0 | 3.0 | 0.0 | 4.0 | 6.9 | 5.1 | 0 |
| | CaO | 1.0 | 4.0 | 0.0 | 2.0 | 8.3 | 4.5 | 0 |
| | SrO | 6.0 | 3.0 | 3.8 | 0.8 | 0.0 | 5.2 | 0 |
| | BaO | 0.0 | 0.0 | 0.0 | 0.2 | 0.0 | 0.0 | 0 |
| | Total RO*[1] | 7.0 | 10.0 | 3.8 | 7.0 | 15.2 | 14.8 | 0 |
| | $Na_2O$ | 0.009 | 0.007 | 0.012 | 0.01 | 12.4 | 0.07 | 0 |
| | $K_2O$ | 0.003 | 0.004 | 0.006 | 0.005 | 0.2 | 0.01 | 0 |
| | Total $R_2O$*[2] | 0.012 | 0.011 | 0.018 | 0.015 | 12.6 | 0.08 | 0 |
| | $Fe_2O_3$ | 0.002 | 0.001 | 0.003 | 0.01 | 0.04 | 0.003 | 0 |
| Ratio | $Al_2O_3/(Al_2O_3 + B_2O_3)$ | 0.16 | 0.27 | 0.16 | 0.26 | 1 | 0.59 | — |
| | $Na_2O/(Na_2O + K_2O)$ | 0.75 | 0.64 | 0.67 | 0.67 | 0.98 | 0.88 | — |

TABLE 2

|  |  | Ex. 8 | Ex. 9 | Ex. 10 | Ex. 11 | Ex. 12 | Ex. 13 |
|---|---|---|---|---|---|---|---|
| Composition [mol %] | $SiO_2$ | 62.0 | 60.0 | 60.0 | 58.0 | 62.0 | 58.0 |
|  | $Al_2O_3$ | 10.0 | 10.0 | 10.0 | 10.0 | 8.0 | 10.0 |
|  | $B_2O_3$ | 21.0 | 23.0 | 26.0 | 26.0 | 23.0 | 25.0 |
|  | $Al_2O_3 + B_2O_3$ | 31.0 | 33.0 | 36.0 | 36.0 | 31.0 | 0.0 |
|  | MgO | 2.0 | 2.0 | 1.0 | 3.0 | 2.0 | 2.0 |
|  | CaO | 3.0 | 3.0 | 2.0 | 2.0 | 3.0 | 3.0 |
|  | SrO | 2.0 | 2.0 | 1.0 | 1.0 | 2.0 | 2.0 |
|  | BaO | 0.0 | 0.0 | 0.0 | 0.0 | 0.0 | 0.0 |
|  | Total RO[*1] | 7.0 | 7.0 | 4.0 | 6.0 | 7.0 | 7.0 |
|  | $Na_2O$ | 0.010 | 0.015 | 0.008 | 0.003 | 0.005 | 0.005 |
|  | $K_2O$ | 0.003 | 0.003 | 0.005 | 0.001 | 0.001 | 0.001 |
|  | Total $R_2O$[*2] | 0.013 | 0.018 | 0.013 | 0.004 | 0.006 | 0.006 |
|  | $Fe_2O_3$ | 0.008 | 0.007 | 0.006 | 0.007 | 0.008 | 0.009 |
| Ratio | $Al_2O_3/(Al_2O_3 + B_2O_3)$ | 0.32 | 0.30 | 0.28 | 0.28 | 0.26 | 0.29 |
|  | $Na_2O/(Na_2O + K_2O)$ | 0.77 | 0.83 | 0.62 | 0.75 | 0.83 | 0.83 |

TABLE 3

|  |  | Ex. 14 | Ex. 15 | Ex. 16 | Ex. 17 | Ex. 18 | Ex. 19 |
|---|---|---|---|---|---|---|---|
| Composition [mol %] | $SiO_2$ | 60.0 | 60.0 | 60.0 | 60.0 | 60.0 | 60.0 |
|  | $Al_2O_3$ | 8.0 | 10.0 | 5.0 | 2.0 | 0.0 | 0.0 |
|  | $B_2O_3$ | 25.0 | 23.0 | 28.0 | 31.0 | 33.0 | 36.0 |
|  | $Al_2O_3 + B_2O_3$ | 33.0 | 33.0 | 33.0 | 33.0 | 33.0 | 36.0 |
|  | MgO | 2.0 | 4.0 | 2.0 | 2.0 | 2.0 | 1.0 |
|  | CaO | 3.0 | 2.0 | 3.0 | 3.0 | 3.0 | 2.0 |
|  | SrO | 2.0 | 1.0 | 2.0 | 2.0 | 2.0 | 1.0 |
|  | BaO | 0.0 | 0.0 | 0.0 | 0.0 | 0.0 | 0.0 |
|  | Total RO[*1] | 7.0 | 7.0 | 7.0 | 7.0 | 7.0 | 4.0 |
|  | $Na_2O$ | 0.005 | 0.005 | 0.005 | 0.005 | 0.005 | 0.005 |
|  | $K_2O$ | 0.001 | 0.001 | 0.001 | 0.001 | 0.001 | 0.001 |
|  | Total $R_2O$[*2] | 0.006 | 0.006 | 0.006 | 0.006 | 0.006 | 0.006 |
|  | $Fe_2O_3$ | 0.008 | 0.010 | 0.006 | 0.006 | 0.005 | 0.005 |
| Ratio | $Al_2O_3/(Al_2O_3 + B_2O_3)$ | 0.24 | 0.30 | 0.15 | 0.06 | 0.00 | 0.00 |
|  | $Na_2O/(Na_2O + K_2O)$ | 0.83 | 0.83 | 0.83 | 0.83 | 0.83 | 0.83 |

TABLE 4

|  |  | Ex. 20 | Ex. 21 | Ex. 22 | Ex. 23 | Ex. 24 | Ex. 25 | Ex. 26 |
|---|---|---|---|---|---|---|---|---|
| Composition [mol %] | $SiO_2$ | 60.0 | 63.0 | 62.0 | 64.0 | 65.0 | 62.0 | 64.0 |
|  | $Al_2O_3$ | 10.0 | 8.0 | 8.0 | 9.0 | 10.0 | 7.2 | 8.5 |
|  | $B_2O_3$ | 21.0 | 16.0 | 23.0 | 18.5 | 14.0 | 23.0 | 18.5 |
|  | $Al_2O_3 + B_2O_3$ | 31.0 | 24.0 | 31.0 | 27.5 | 24.0 | 30.2 | 27.0 |
|  | MgO | 2.0 | 4.0 | 4.0 | 2.5 | 4.0 | 4.3 | 2.5 |
|  | CaO | 3.0 | 5.0 | 2.0 | 3.5 | 5.0 | 2.5 | 4.0 |
|  | SrO | 4.0 | 3.0 | 1.0 | 2.5 | 2.0 | 1.0 | 2.5 |
|  | BaO | 0.0 | 1.0 | 0.0 | 0.0 | 0.0 | 0.0 | 0.0 |
|  | Total RO[*1] | 9.0 | 13.0 | 7.0 | 8.5 | 11.0 | 7.8 | 9.0 |
|  | $Na_2O$ | 0.01 | 0.012 | 0.004 | 0.006 | 0.005 | 0.005 | 0.008 |
|  | $K_2O$ | 0.002 | 0.003 | 0.001 | 0.001 | 0.001 | 0.001 | 0.002 |
|  | Total $R_2O$[*2] | 0.012 | 0.015 | 0.005 | 0.007 | 0.006 | 0.006 | 0.010 |
|  | $Fe_2O_3$ | 0.008 | 0.010 | 0.010 | 0.003 | 0.002 | 0.005 | 0.005 |
| Ratio | $Al_2O_3/(Al_2O_3 + B_2O_3)$ | 0.32 | 0.33 | 0.26 | 0.33 | 0.42 | 0.24 | 0.31 |
|  | $Na_2O/(Na_2O + K_2O)$ | 0.83 | 0.80 | 0.80 | 0.86 | 0.83 | 0.83 | 0.80 |

TABLE 5

|  | Ex. 1 | Ex. 2 | Ex. 3 | Ex. 4 | Ex. 5 | Ex. 6 | Ex. 7 |
| --- | --- | --- | --- | --- | --- | --- | --- |
| Young's modulus [GPa] | 58 | 66 | (51) | 59 | 73 | 76 | 74 |
| Average coefficient of thermal expansion [ppm/° C.] | 3.4 | 3.3 | (2.8) | 3.2 | 8.5 | 3.8 | 0.7 |
| Relative permittivity @ 10 GHz | 4.47 | 4.62 | 3.96 | 4.36 | (6.80) | 5.49 | 3.75 |
| Relative permittivity @ 35 GHz | 4.39 | 4.57 | 4.09 | 4.35 | 7.13 | 5.41 | 3.87 |
| Dielectric loss tangent @ 10 GHz ($\times 10^{-3}$) | 1.79 | 2.42 | 1.22 | 1.80 | (22.0) | 6.20 | 0.11 |
| Dielectric loss tangent @ 35 GHz ($\times 10^{-3}$) | 2.48 | 3.04 | 1.82 | 2.61 | 20.9 | 8.98 | 0.15 |
| (Relative permittivity @ 35 GHz)/(relative permittivity @ 10 GHz) | 0.98 | 0.99 | 1.03 | 1.00 | 1.05 | 0.99 | 1.03 |
| (Dielectric loss tangent @ 35 GHz)/(dielectric loss tangent @ 10 GHz) | 1.39 | 1.26 | 1.49 | 1.45 | 0.95 | 1.45 | 1.29 |
| Density [g/cm³] | 2.32 | 2.34 | (2.24) | 2.26 | 2.49 | 2.50 | 2.20 |
| Specific modulus [GPa · cm³/g] | 25 | 28 | 23 | 26 | 29 | 30 | 34 |
| Porosity [%] | 0 | 0 | 0 | 0 | 0 | 0 | 0 |
| Transmittance [%] (0.3-0.4 mmt) | 90 | 90 | 90 | 90 | 90 | 90 | 93 |
| β-OH [mm⁻¹] | 0.21 | 0.34 | — | 0.48 | 0.19 | 0.28 | — |
| Devitrification temperature [° C.] | 1200° C. or less | 1200° C. or less | 1200° C. or less | 1220 | 1000° C. or less | 1270 | — |

TABLE 6

|  | Ex. 8 | Ex. 9 | Ex. 10 | Ex. 11 | Ex. 12 | Ex. 13 |
| --- | --- | --- | --- | --- | --- | --- |
| Young's modulus [GPa] | 62 | 61 | 58 | 59 | 58 | 59 |
| Average coefficient of thermal expansion [ppm/° C.] | (3.0) | (3.1) | (2.7) | (2.9) | 3.3 | (3.1) |
| Relative permittivity @ 10 GHz | 4.56 | 4.56 | 4.34 | 4.42 | 4.41 | 4.53 |
| Relative permittivity @ 35 GHz | 4.59 | 4.58 | 4.39 | 4.43 | 4.43 | 4.55 |
| Dielectric loss tangent @ 10 GHz ($\times 10^{-3}$) | 2.20 | 2.16 | 1.59 | 1.88 | 1.86 | 1.99 |
| Dielectric loss tangent @ 35 GHz ($\times 10^{-3}$) | 3.27 | 3.25 | 2.32 | 2.74 | 2.86 | 3.38 |
| (Relative permittivity @ 35 GHz)/(relative permittivity @ 10 GHz) | 1.01 | 1.00 | 1.01 | 1.00 | 1.00 | 1.00 |
| (Dielectric loss tangent @ 35 GHz)/(dielectric loss tangent @ 10 GHz) | 1.49 | 1.51 | 1.46 | 1.46 | 1.54 | 1.70 |
| Density [g/cm³] | 2.30 | 2.30 | 2.25 | 2.26 | 2.27 | 2.29 |
| Specific modulus [GPa · cm³/g] | 27 | 27 | 26 | 26 | 26 | 26 |
| Porosity [%] | 0 | 0 | 0 | 0 | 0 | 0 |
| Transmittance [%] (0.3-0.4 mmt) | 90 | 90 | 90 | 90 | 90 | 90 |
| β-OH [mm⁻¹] | (0.35) | (0.35) | (0.35) | (0.35) | 0.43 | (0.35) |
| Devitrification temperature [° C.] | 1330 | 1295 | 1420° C. or more | 1420° C. or more | 1170 | 1310 |

TABLE 7

|  | Ex. 14 | Ex. 15 | Ex. 16 | Ex. 17 | Ex. 18 | Ex. 19 |
| --- | --- | --- | --- | --- | --- | --- |
| Young's modulus [GPa] | 57 | 61 | 53 | (42) | (39) | (35) |
| Average coefficient of thermal expansion [ppm/° C.] | (3.1) | (2.9) | (3.2) | (3.3) | (3.4) | (3.0) |

TABLE 7-continued

|  | Ex. 14 | Ex. 15 | Ex. 16 | Ex. 17 | Ex. 18 | Ex. 19 |
|---|---|---|---|---|---|---|
| Relative permittivity @ 10 GHz | 4.44 | 4.48 | 4.27 | 4.04 | 3.86 | 3.77 |
| Relative permittivity @ 35 GHz | 4.46 | 4.51 | 4.26 | 4.10 | 3.84 | 3.79 |
| Dielectric loss tangent @ 10 GHz (×10$^{-3}$) | 1.81 | 1.99 | 1.55 | 1.29 | 1.60 | 1.74 |
| Dielectric loss tangent @ 35 GHz (×10$^{-3}$) | 2.76 | 2.98 | 2.39 | 1.94 | 1.85 | 2.01 |
| (Relative permittivity @ 35 GHz)/(relative permittivity @ 10 GHz) | 1.00 | 1.01 | 1.00 | 1.01 | 0.99 | 1.01 |
| (Dielectric loss tangent @ 35 GHz)/(dielectric loss tangent @ 10 GHz) | 1.53 | 1.50 | 1.54 | 1.50 | 1.16 | 1.15 |
| Density [g/cm$^3$] | 2.27 | 2.28 | 2.23 | (2.20) | (2.17) | (2.11) |
| Specific modulus [GPa · cm$^3$/g] | 25 | 27 | 24 | 19 | 18 | 16 |
| Porosity [%] | 0 | 0 | 0 | 0 | 0 | 0 |
| Transmittance [%] (0.3-0.4 mmt) | 90 | 90 | 90 | — | — | — |
| β-OH [mm$^{-1}$] | 0.48 | (0.35) | 0.52 | (0.35) | (0.35) | (0.35) |
| Devitrification temperature [° C.] | 1160 | 1340 | 1040 | — | — | — |

TABLE 8

|  | Ex. 20 | Ex. 21 | Ex. 22 | Ex. 23 | Ex. 24 | Ex. 25 | Ex. 26 |
|---|---|---|---|---|---|---|---|
| Young's modulus [GPa] | (59) | (64) | (59) | (64) | (70) | 59 | 64 |
| Average coefficient of thermal expansion [ppm/° C.] | (3.4) | (3.8) | 3.1 | 3.4 | (3.4) | 3.5 | 3.5 |
| Relative permittivity @ 10 GHz | (4.83) | (5.12) | 4.38 | 4.66 | 4.89 | 4.36 | 4.63 |
| Relative permittivity @ 35 GHz | (4.85) | (5.12) | 4.34 | 4.63 | 4.84 | 4.36 | 4.61 |
| Dielectric loss tangent @10 GHz (×10$^{-3}$) | (2.97) | (4.01) | 1.79 | 2.45 | 3.18 | 1.74 | 2.36 |
| Dielectric loss tangent @ 35 GHz (×10$^{-3}$) | (4.23) | (5.44) | 2.64 | 3.40 | 4.80 | 2.63 | 3.56 |
| (Relative permittivity @ 35 GHz)/(relative permittivity @ 10 GHz) | 1.00 | 1.00 | 0.99 | 0.99 | 0.99 | 1.00 | 0.99 |
| (Dielectric loss tangent @ 35 GHz)/(dielectric loss tangent @ 10 GHz) | 1.42 | 1.36 | 1.47 | 1.39 | 1.51 | 1.51 | 1.51 |
| Density [g/cm$^3$] | (2.36) | (2.42) | (2.26) | (2.33) | (2.38) | (2.26) | (2.33) |
| Specific modulus [GPa · cm$^3$/g] | 25 | 26 | 26 | 27 | 29 | 26 | 27 |
| Porosity [%] | 0 | 0 | 0 | 0 | 0 | 0 | 0 |
| Transmittance [%] (0.3-0.4 mmt) | 90 | 90 | 90 | 90 | 90 | 90 | 90 |
| β-OH [mm$^{-1}$] | (0.35) | (0.35) | (0.35) | (0.35) | (0.35) | 0.49 | 0.53 |
| Devitrification temperature [° C.] | — | — | 1230 | 1220 | 1300 | 1290 | 1350 |

TABLE 9

|  | Ex. 27 | Ex. 28 |
|---|---|---|
| Material | polyimide resin 1 | polyimide resin 2 |
| Relative permittivity @ 10 GHz | 3.27 | 3.52 |
| Dielectric loss tangent @ 10 GHz (×10$^{-3}$) | 2.33 | 1.49 |

As (a) of FIG. 2 shows, the values obtained by dividing [the dielectric loss tangent at each temperature from −40 to 150° C. at 10 GHz] by [the dielectric loss tangent at 20° C. and 10 GHz] were: 0.93-1.06 in Example 4; 0.99-1.00 in Example 6; 0.98-1.13 in Example 27; and 0.85-1.20 in Example 28. Examples 4 and 6, which are examples of the first aspect of the present invention, had a smaller temperature dependence of dielectric loss tangent at 10 GHz as compared with Examples 27 and 28 which are comparative examples.

As (b) of FIG. 2 shows, the values obtained by dividing [the relative permittivity at each temperature from −40 to 150° C. at 10 GHz] by [the relative permittivity at 20° C. and 10 GHz] were: 0.998-1.006 in Example 4; 0.994-1.013 in Example 6; 0.992-1.005 in Example 27; and 0.988-1.001 in Example 28. Example 4, which is an example of the second aspect of the present invention, had a smaller temperature dependence of relative permittivity at 10 GHz as compared with Examples 6, 27, and 28 which are comparative examples.

The substrates of the present invention have a small temperature dependence of relative permittivity and/or dielectric loss tangent at 10 GHz and further have small values of dielectric loss tangent at 35 GHz. Therefore, even when the substrates are used under environments where temperature fluctuations are large as high-frequency-device substrates or liquid-crystal-antenna substrates required to be low in dielectric loss tangent, change in dielectric characteristics is little and thus stable performances can be exhibited.

While the present invention has been described in detail and with reference to specific embodiments thereof, it is apparent to one skilled in the art that various changes and modifications can be made therein without departing from the spirit and scope thereof. This application is based on a Japanese patent application filed on Mar. 20, 2018 (Application No. 2018-53081), the entire contents thereof being incorporated herein by reference. All the references cited here are incorporated herein as a whole.

INDUSTRIAL APPLICABILITY

The substrates of the present invention are highly effective in reducing the dielectric loss of high-frequency signals and show stable properties under a wide temperature range. Consequently, circuit boards employing the substrates are highly reduced in the transmission loss of high-frequency signals and can be used in any environment.

Such substrates and circuit boards are very useful as members for the whole high-frequency electronic devices in which high-frequency signals having a frequency higher than 10 GHz, especially signals having a frequency higher than 30 GHz, in particularly, frequency of 35 GHz or higher, are handled, or as members for liquid-crystal antennas and the like which are used in environments where temperature fluctuations are large.

REFERENCE SIGNS LIST

1 Circuit board
2 Substrate
2a First main surface
2b Second main surface
3 First wiring layer
4 Second wiring layer

The invention claimed is:

1. A substrate, comprising:
   $SiO_2$;
   $Al_2O_3$;
   $B_2O_3$;
   alkali metal oxides including $Na_2O$ and $K_2O$; and
   alkaline-earth metal oxides including MgO, CaO and SrO,
   wherein the $SiO_2$ is a main component in a mole percentage on an oxide basis, a total amount of the $Al_2O_3$ and the $B_2O_3$ is in a range of 1 to 24%, the substrate has a content molar ratio of $\{Al_2O_3/(Al_2O_3+B_2O_3)\}$ in a range of 0 to 0.45 and a content molar ratio of $\{Na_2O/(Na_2O+K_2O)\}$ in a range of 0.01 to 0.99, an amount of the $Al_2O_3+1\%$ is equal to or greater than 4% and is less than a total amount of the MgO, the CaO and the SrO, a content of the MgO is 3% or higher, a total amount of the alkaline-earth metal oxides is in a range of 5 to 13%, and the substrate has a dielectric loss tangent (A) as measured at 20° C. and 10 GHz of 0.1 or less, a dielectric loss tangent (B) as measured at 20° C. and 35 GHz of 0.1 or less, and a ratio of [a dielectric loss tangent (C) as measured at an arbitrary temperature in a range of −40 to 150° C. and at 10 GHz]/[the dielectric loss tangent (A)] in a range of 0.90 to 1.10.

2. The substrate according to claim 1, wherein the substrate has at least one main surface having a longest portion in a length of 10 cm or larger and a shortest portion in a length of 5 cm or larger.

3. The substrate according to claim 1, wherein the substrate has a thickness in a range of 0.05 to 2 mm.

4. The substrate according to claim 1, wherein the substrate has an average coefficient of thermal expansion at 50-350° C. in a range of 3 to 15 ppm/° C.

5. The substrate according to claim 1, wherein the substrate has a Young's modulus of 40 GPa or higher.

6. The substrate according to claim 1, wherein the substrate has the Young's modulus of 70 GPa or less.

7. The substrate according to claim 1, wherein the substrate has a porosity of 0.1% or less.

8. The substrate according to claim 1, wherein the substrate has a transmittance for light having 350-nm wavelength of 50% or higher.

9. The substrate according to claim 1, wherein the substrate has a β-OH value in a range of 0.05 to 0.8 $mm^{-1}$.

10. The substrate according to claim 1, wherein the alkali metal oxides are in a total amount in a range of 0.001 to 5% in mole percentage on an oxide basis.

11. The substrate according to claim 1, wherein the $Al_2O_3$ is in an amount in a range of 3% to 10%, and the $B_2O_3$ is in an amount in a range of 9 to 21% in mole percentage on an oxide basis.

12. The substrate according to claim 11, wherein the substrate has a β-OH value in a range of 0.05 to 0.8 $mm^{-1}$.

13. The substrate according to claim 11, wherein the alkali metal oxides are in a total amount in a range of 0.001 to 5% in mole percentage on an oxide basis.

14. The substrate according to claim 11, further comprising:
   Fe in an amount in a range of 0 to 0.012% in terms of $Fe_2O_3$ in mole percentage on an oxide basis.

15. The substrate according to claim 1, further comprising:
   Fe in an amount in a range of 0 to 0.012% in terms of $Fe_2O_3$ in mole percentage on an oxide basis.

16. A liquid-crystal antenna, comprising:
   the substrate of claim 1.

17. A high-frequency device, comprising:
   the substrate of claim 1.

18. A substrate, comprising:
   $SiO_2$;
   $Al_2O_3$;
   $B_2O_3$;
   alkali metal oxides including $Na_2O$ and $K_2O$; and
   alkaline-earth metal oxides including MgO, CaO and SrO,
   wherein the $SiO_2$ is a main component in a mole percentage on an oxide basis, a total amount of the $Al_2O_3$ and the $B_2O_3$ is in a range of 1 to 24%, an amount of the CaO is in a range of 1 to 8%, an amount of the SrO is at least 0.1%, the substrate has a content molar ratio of $\{Al_2O_3/(Al_2O_3+B_2O_3)\}$ in a range of 0 to 0.45 and a content molar ratio of $\{Na_2O/(Na_2O+K_2O)\}$ in a range of 0.01 to 0.99 among the at least one alkali metal oxide an amount of $Al_2O_3+1\%$ is equal to or greater than 4% and less than a total amount of the MgO, the CaO and the SrO, a content of the MgO is 3% or higher, a total amount of the alkaline-earth metal oxides is in a range of 5 to 13%, and the substrate has a dielectric loss tangent (A) as measured at 20° C. and 10 GHz of 0.1 or less, a dielectric loss tangent (B) as measured at 20°

C. and 35 GHz of 0.1 or less, and a ratio of [a dielectric loss tangent (C) as measured at an arbitrary temperature in a range of −40 to 150° C. and at 10 GHz]/[the dielectric loss tangent (A)] in a range of 0.90 to 1.10.

19. The substrate according to claim 18, wherein the substrate has at least one main surface having a longest portion in a length of 10 cm or larger and a shortest portion in a length of 5 cm or larger.

20. The substrate according to claim 18, wherein the substrate has a thickness in a range of 0.05 to 2 mm.

21. The substrate according to claim 18, wherein the substrate has an average coefficient of thermal expansion at 50-350° C. in a range of 3 to 15 ppm/° C.

22. The substrate according to claim 18, wherein the substrate has a Young's modulus of 40 GPa or higher.

23. The substrate according to claim 18, wherein the substrate has the Young's modulus of 70 GPa or less.

24. The substrate according to claim 18, wherein the substrate has a porosity of 0.1% or less.

25. The substrate according to claim 18, wherein the substrate has a transmittance for light having 350-nm wavelength of 50% or higher.

26. The substrate according to claim 18, wherein the substrate has a β-OH value in a range of 0.05 to 0.8 $mm^{-1}$.

27. The substrate according to claim 18, wherein the alkali metal oxides are in a total amount in a range of 0.001 to 5% in mole percentage on an oxide basis.

28. The substrate according to claim 18, wherein the $Al_2O_3$ is in an amount in a range of 3% to 10%, and the $B_2O_3$ is in an amount in a range of 9 to 21% in mole percentage on an oxide basis.

29. The substrate according to claim 18, further comprising:
Fe in an amount in a range of 0 to 0.012% in terms of $Fe_2O_3$ in mole percentage on an oxide basis.

30. A liquid-crystal antenna, comprising:
the substrate of claim 18.

31. A high-frequency device, comprising:
the substrate of claim 18.

* * * * *